United States Patent [19]

Launay

[11] 4,293,049

[45] Oct. 6, 1981

[54] METERING AND BALANCING DEVICE AND FILLING MACHINE INCLUDING SUCH A DEVICE

[75] Inventor: Noël Launay, Beauvais, France

[73] Assignee: Societe d'Assistance Technique pour Produits Nestle S.A., Lausanne, Switzerland

[21] Appl. No.: 192,507

[22] PCT Filed: Jun. 7, 1979

[86] PCT No.: PCT/CH79/00085

§ 371 Date: Mar. 17, 1980

§ 102(e) Date: Mar. 17, 1980

[87] PCT Pub. No.: WO80/00245

PCT Pub. Date: Feb. 21, 1980

[30] Foreign Application Priority Data

Jul. 20, 1978 [FR] France ................. 78 21507

[51] Int. Cl.³ .......................... G01G 1/38; G01G 1/36
[52] U.S. Cl. ..................................... 177/212; 177/249
[58] Field of Search ................ 177/212, 246, 249–251

[56] References Cited

U.S. PATENT DOCUMENTS 2,127,063  8/1938  Levy et al. ................ 177/249 X
3,131,090  4/1964  Bell ........................... 177/246 X
3,997,012  12/1976  Chambers ................. 177/212 X

*Primary Examiner*—George H. Miller, Jr.
*Attorney, Agent, or Firm*—Vogt & O'Donnell

[57] ABSTRACT

Field of the invention: filling machine industry.

Device consisting of a lever made up of two arms arranged on each side of a fixed pivoting axis. The end of the first arm supports the end of a rod, movable axially and vertically to rotate the arm and ending at the other end in a load-carrying platform moving downwards as the load increases. The end of the second arm, consisting of two parts pivoting about a movable axis, carries a counter-weight and by sliding along the pivoting part on a fixed axis may itself slide along a straight inclinable rail. By suitable selection of both the weight of the counter-weight and the slope of the straight rail, the lever is balanced at the same time in two positions, one corresponding to zero load on the platform and the other to a predetermined load placed on the platform, there being substantial equilibrium in intermediate positions.

Use: Metering of bulk products discharged into containers by filling machines.

4 Claims, 6 Drawing Figures

METERING AND BALANCING DEVICE AND FILLING MACHINE INCLUDING SUCH A DEVICE

This invention is concerned with a metering device for dispensing bulk products into containers, which is applicable in particular to machines for filling bulk containers with ice cream.

Currently known machines for filling containers with products, as for example ice cream, and hereafter called bulk (ice cream) containers, generally comprise a conveyor with mechanical advance on which the bulk containers to be filled are placed, and of which the progress is periodically interrupted to allow each of the successive containers to be held stationary under the filling device, which only delivers ice cream between the instant when the container is stationary below it and the instant when, the container being filled, flow of ice cream is stopped, the conveyor being then restarted on the one hand, to remove the filled container and bring the following one under the filling device, and so on, the ice cream flow being interrupted during the time interval in which each new container is moved up to that device.

In machines with high output, that is those having a maximum filling capacity of about 1000 filled containers per hour, the ice cream that does not flow during the time where a container that has just been filled is exchanged for the following empty ice cream container, is stored and accumulated within a reservoir acting as a buffer. However, this manner of proceeding has the disadvantage of producing, during accumulation in the buffer tank between two fillings, compression of the ice cream which has a negative effect on the overrun. Moreover, the techniques described above are practically inapplicable to "hard" ice cream, that is ice cream which is at a temperature below about −9° C.

On the other hand, the back pressure permitting the ice cream to spread over all the surface of the container during filling, back pressure which is obtained by mechanical or pneumatic processes, does not take into account the weight of the ice cream and its variations during filling of the container.

The present invention overcomes these drawbacks by providing a metering mechanism for a bulk product, in particular for metering the quantity of ice cream, co-operating with a filling machine in such a way that interruption of flow of the product being filled is not necessary and, in this manner it becomes possible to increase the hourly filling rate and practically eliminate compression of the product which has a negative effect on the desired overrun. Such a machine makes possible the filling of bulk containers with ice cream at a temperature which is below about 9° C. and, in addition, to compensate constantly during filling the effect of the increasing weight of the container on the back pressure, so that the ice cream may spread over the whole surface of the container during filling.

According to the invention the apparatus for metering and balancing the total load of each container during filling consists of a movable beam rotatable about a horizontal axis fixed with respect to the frame of the machine and acting as a first-order lever on the end of the first arm of which rests the end of a vertical rod guided in axial movement and of which the other end is fixed to the lower surface of the platform supporting the container during filling, and of which the other arm is made up of two mutually-articulated parts, the first being directly fixed to the first arm and movable simultaneously therewith rotatably about the axis of the beam; at its free end, this first part of the second arm is provided with a slide within which a hinged counterweight may slide rotatably about a horizontal axis parallel to the axis of the beam. The bearing forming the support of the counterweight is provided with means which allow it to move in the slide and is connected to a part which constitutes the second part of the second arm of the beam and which comprises, at its free end opposed to that carrying the bearing, a slide movable along a straight rail acting as a guide; this straight rail, which is disposed in a plane perpendicular to the axes of rotation of the beam and the counterweight is inclined at a pre-determined angle dependent on the amount of product to be dispensed into each container. Moreover, the lengths of the arms of the beams on the one hand, and the weight and slope of the straight rail co-operating with the second arm on the other, are selected and calculated in such manner that moments of forces acting on each of the arms are substantially equal at all times.

Thus, to each position of the beam corresponds a fixed weight of product in the container being filled.

In order to provide for the adaptation of a metering and balancing mechanism to different possibilities, that is adaptation both to the specific gravity of the product being filled and the amount of product to be filled into the container, the inclination of the straight rail which co-operates with the second arm of the beam of the device for metering and balancing the load of containers being filled is made adjustable. For this purpose, and in one embodiment, the lower end of the rail is hinged for rotation about a fixed axis, parallel to the axis of rotation of the beam, whereas its upper end acting as a slide co-operates both with a sliding element movable along a straight horizontal rail having its axis at right angles to the axis of rotation of the beam the position of which is adjustable and, via a part affixed to the sliding element and rotatable about an axis fixed with respect thereto, which axis remains parallel to the axis of rotation of the beam, with a straight guide-path provided on the part.

A filling machine provided with the metering device according to the invention is for example essentially characterized in that it comprises: means for stepwise moving the containers to a filling station, means for distributing the containers alternatively beneath a first pouring device for the product to be filled and beneath a second pouring device for the product to be filled, and means for conveying each container filled with a predetermined amount of product to a removal means, each of the filling devices being arranged opposite a platform for receiving and supporting the container. This platform co-operates at all times with the metering and balancing device according to the invention during the filling of the total load of the container, this device itself co-operating with a means for locking the metering and balancing device in the position which corresponds to the filling of a container containing the predetermined quantity of product to be filled. The different means used for obtaining the different movements co-operate with each other in a programmed manner by means of devices carrying out different logical functions co-ordinating the movement and operation of hydraulic jacks controlling different movements so that one container out of two is always being filled.

The features and advantages of the invention will be more apparent from the following description, given as a non-limiting example, of one possible realization of the invention and with reference to the accompanying drawings.

In the drawings.

In the drawings like reference numbers are used for like parts.

Figure 1:
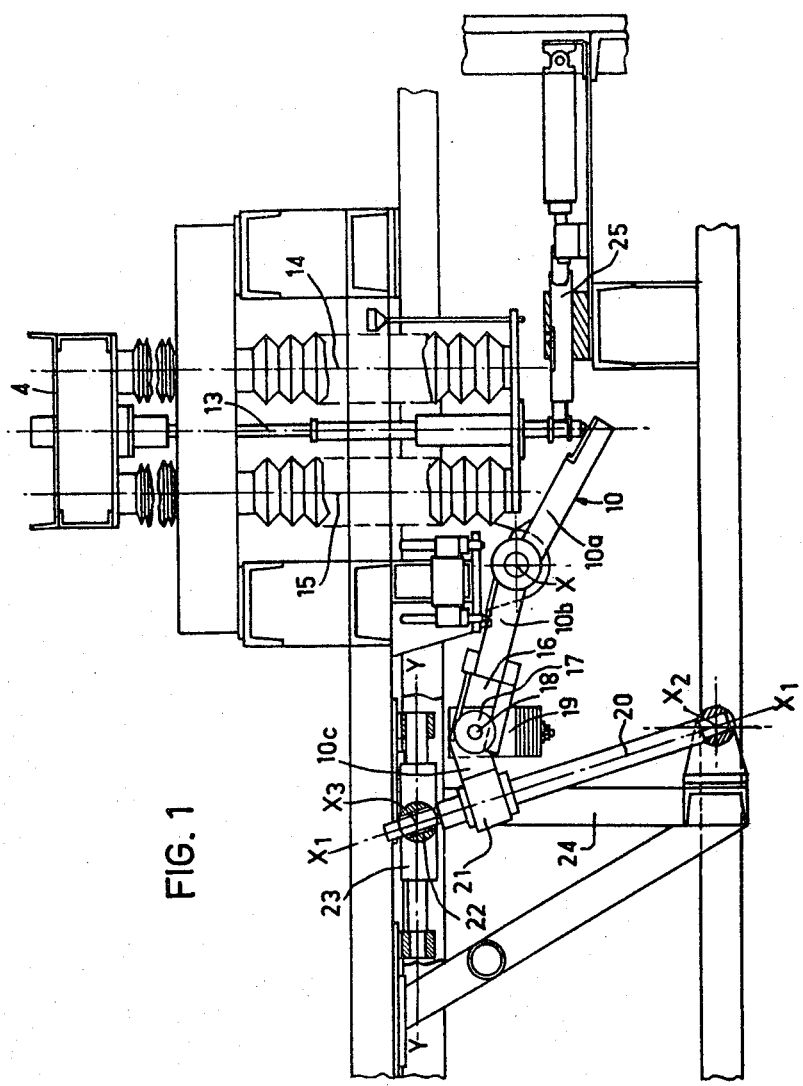
FIG. 1 shows a side view of the metering device according to the invention by itself.
Figure 2:
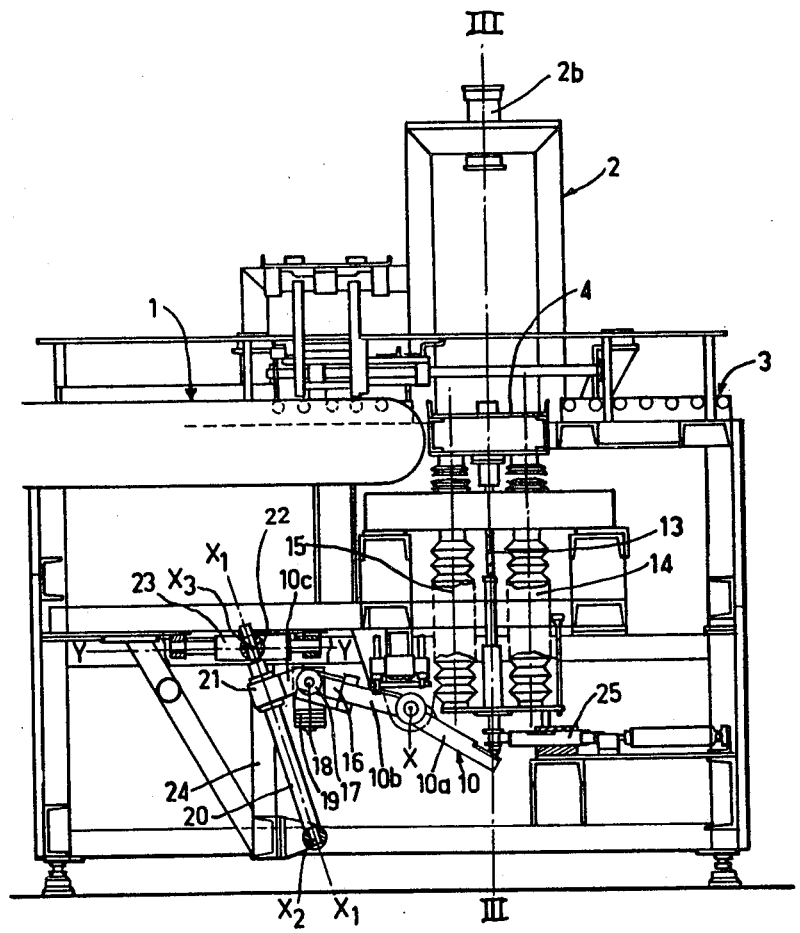
FIG. 2 shows a side view of an apparatus including the metering device according to the invention shown in FIG. 1 and built into the machine.
Figure 3:
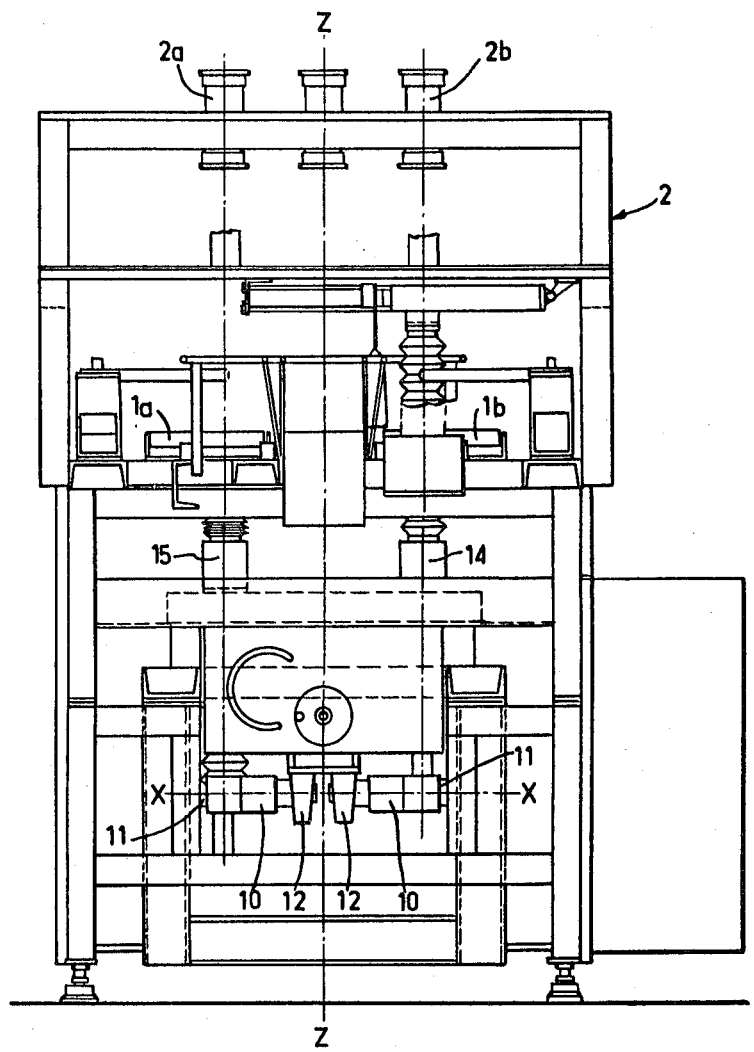
FIG. 3 is a section of the apparatus shown in FIG. 2 along the line III—III of FIG. 2.

Referring first to FIGS. 1, 2 and 3, a filling machine including the metering device according to the invention essentially comprises a first conveying means 1 for advancing singly the containers to be filled with product, that is, in particular, bulk ice cream containers, to the filling station 2 and continuous removal means 3 for containers filled with a pre-determined weight of product. The conveying means 1 advantageously consists of a conveyor in two parts 1a, 1b with stepwise advance of known type; the length of each step depends, in particular, on the dimensions of the containers, whereas the time interval between two successive steps is related to the filling time. Containers 4 are taken from a distributing station (not shown) and placed on the entry conveyor, generally by hand and marked automatically on passing an automatic marking section (not shown) synchronised in known manner with the entry conveyor and taken to the entrance of the filling station 2 where two valves 2a and 2b are arranged for filling the containers with ice cream drawn from a freezing tank (not shown).

When a container is presented by the conveyor 1, its presence is detected by a detector of known type, for example a photosensitive cell, and marked; depending on the marking it is moved by a system operated by fluid under pressure either to a first platform 4 acting as a support for the container and arranged below one of the two pouring valves, or to a second platform 4 located at the same level as the first in stationary position acting as a support for the container and located beneath the second product pouring valve. For this purpose, in the first step the relevant container is raised, by an auxiliary platform, up to the level of the container receiving and supporting platform, moved by a piston (not shown) operated by fluid under pressure. On reaching the common level of the two receiving platforms, the container is pushed onto its assigned platform by a piston operation of which, for pushing the container onto one or other platform, is determined by a controller associated with a receiver which registered signals sent by the markings applied to the containers.

Each of the container receiving platforms co-operates with the container metering and balancing device according to the invention located inside a protective box. These two identical devices operate as described hereafter and are synchronised and programmed in such manner that at all times one of the containers is either being filled so that the discharge of product being filled is never interrupted.

The two metering and balancing devices according to the invention, particularly as represented in FIGS. 1 and 2 are designed for accurate metering of the quantity of ice cream to be deposited in the corresponding container or in general terms the amount of product to be filled into the corresponding container, is essentially made of a beam 10 acting as a simple lever, that is a lever having two arms 10a and 10b affixed to each other, arranged on either side of a fixed axis X—X and rotatable about an axis passing through the point A. This lever, rotatable about the axis X—X fixed with respect to the lower frame of the machine, comprises the two arms 10a and 10b arranged on either side of this axis corresponding to each of the bearings 11 and 12, the two arms being affixed to each other. The first of these arms is in one piece whereas the second is made up of two parts 10b and 10c. The upper part of the end of the first, that is the arm 10a, rests on the end of a vertical rod 13 movable axially and guided for this purpose by an assembly of two rails 14 and 15 fixed with respect to the lower frame, provided with protecting bellows, the other end providing the support for the platform which receives a container being filled.

The contacting ends both of the vertical rod 13 and arm 10a are constructed in any suitable manner so that the movement of one on the other produces as little friction as possible.

At the end of the second arm of the lever 10b, opposed to the axis of rotation X—X, is provided a rail 16 in which may move longitudinally the slide 17 attached to the second part 10c of the second arm, which second part, on the one hand, is provided with a bearing 18 the axis of which is perpendicular to the axis of the rail and in which the supporting shaft of a counterweight 19 may rotate freely about the axis and, on the other hand, is movable along a straight rail 20 by means of a slide 21 of a form suited to the profile of the straight rail. This is made up of a rod the longitudinal axis X1—X1 of which lies in a vertical plane perpendicular to the axis X—X and articulated on the one hand at its lower end about a fixed axis of rotation X2—X2 arranged in the lower part of the frame of the machine and parallel to the preceding and, on the other hand, at the opposed other end, about an axis of rotation X3—X3, parallel to the axis X2—X2, but of which the position is adjustable between two points selected on a fixed horizontal straight line Y—Y, at right angles to the fixed axis X2—X2, which provides for adjustment of the slope of the guide at any pre-determined value. For this purpose, the end of the rod which pivots on the axis X3—X3 is provided with a slide movable along a rail formed in part 22, freely rotatable about the axis X3—X3 and disposed on a slide 23 movable along the axis Y—Y between the two end points mentioned above and lockable at any desired position selected between the two end points by any suitable means of known type.

The filling machine comprises two of these devices which are symmetrical one with respect to the other in the longitudinal median plane Z—Z of the machine, but remain independent of each other insofar as purely mechanical operation is concerned, the corresponding levers being pivoted as shown in FIG. 2, on the one hand, on a vertical support 24 of the lower frame of the machine and, on the other hand, on the bearing 11 and 12, the corresponding coaxial shafts being separated from each other between the two bearings.

Figure 4:
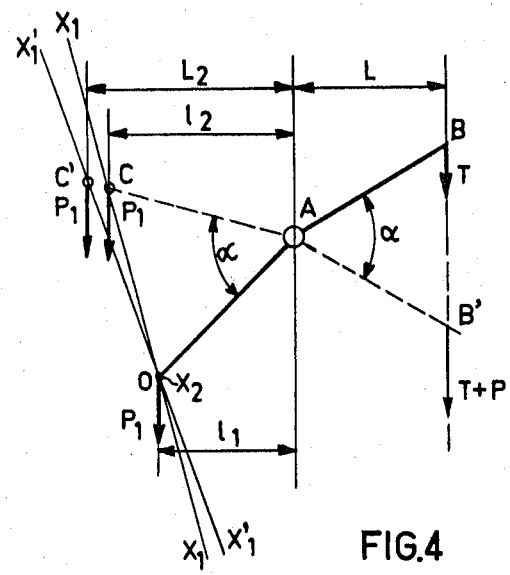
FIGS. 4 and 5 are respectively an explanatory diagram of the operation of the metering device and an operating graph thereof.

The operating diagram of each of the two assemblies making up the balancing device is shown in FIG. 4. If the axes of the two arms of one of the levers 10 is represented by AB and AC, the point A being the fulcrum of the lever, the distance AB represents the length of the arm 10a at all times during its movement, that is the length between point A and point B, point of contact of the end of the rod 13 and of the ledge at the end of the arm, whereas the distance AC represents a distance from point A to point C of the longitudinal axis $X_1$-$X_2$ of the straight rail 20 with which the center of the slide 21 movable in a straight line along the inclined rail 20 coincides at all times. Thus the length of the arm AC varies constantly when, the lever rotating about its axis of rotation, the bearing carrying the shaft of the counter-weight slides along the end of the arm of the lever. Hence, during filling of a container, placed on one of the supports, of which as a result the total weight and subsequently the force it exerts at the end of the arm 10a via the vertical rod 13 increases as the container fills and, on the one hand, the length of the arm of the lever AB changes because the location of its end itself changes, the distance separating the horizontal axis of rotation of the lever from the longitudinal axis of the rod itself remains constant, whereas, on the other hand, because of the slope of the straight rail 20, the distance between the axis X—X and its longitudinal axis X1—X1 is itself variable.

When there is no empty container on the receiving platform, the counter-weight-carrying part is at the bottom of the straight rail at O whereas the end of the first arm is at point B, the highest position that it can reach.

Figure 5:
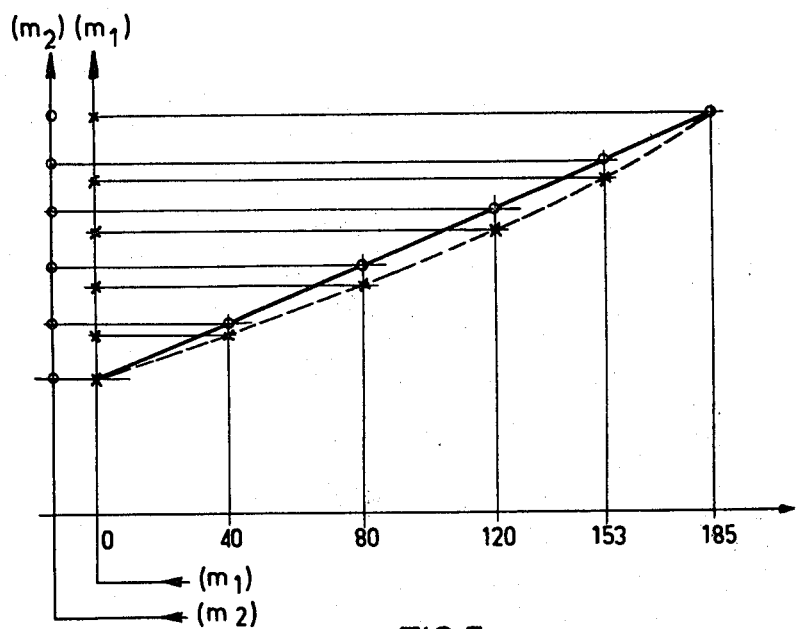
Figure 6:
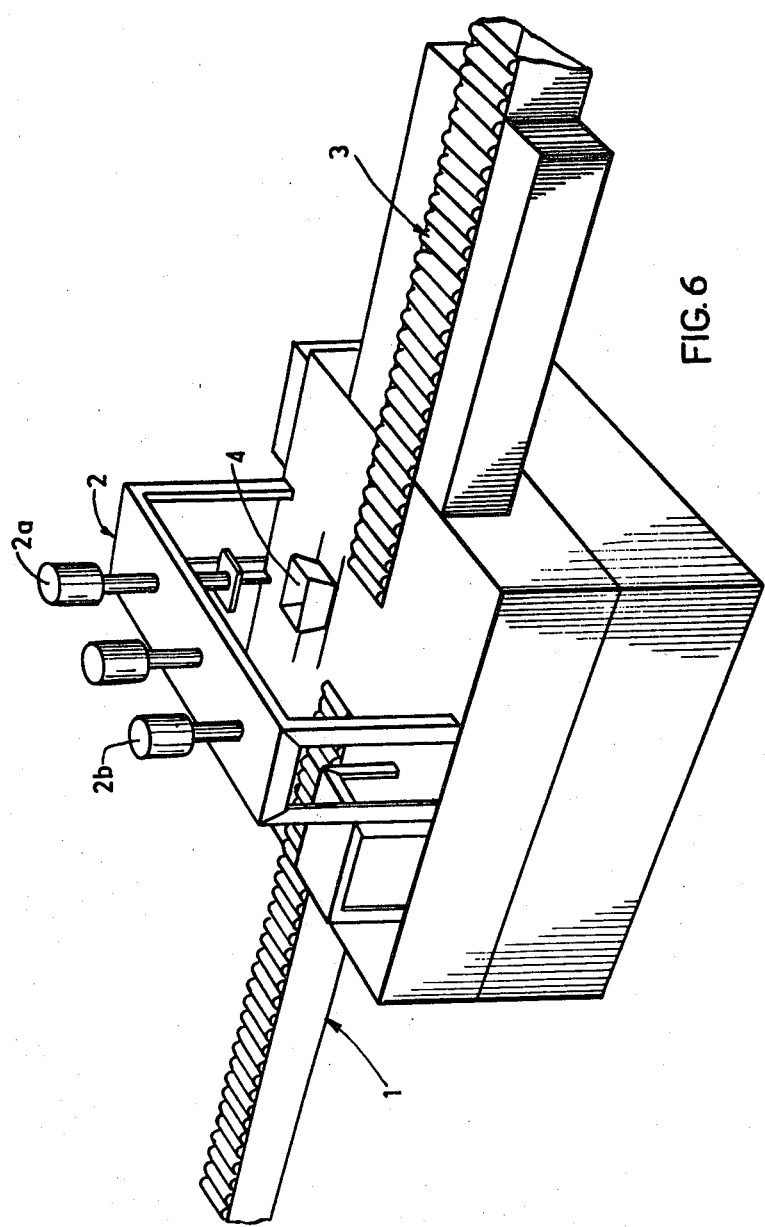
FIG. 6 is a partial perspective schematic view of the whole filling machine including the metering device according to the invention.

The force then exerted by the assembly attached to the container-carrying platform on the end B of the first arm of the lever is the force T resulting from the weight of the platform and the associated vertical rod, that of the empty container and of the weight of the first arm whereas the force $P_1$ acting on the second arm of the lever is equal to the weight of the counter-weight plus the weight of the whole mechanism making up the second arm. If L is the distance between the axis of rotation of the lever and the vertical axis of the rod, $l_1$ the distance between point O defined above and this axis of rotation, the moments of the forces T and $P_1$ about this axis of rotation are respectively equal to $T \times L$ and $P_1 \times l_1$ and equal in absolute terms so that: $T \times L = P_1 \times l_1$. As the weight of the container increases because it is progressively filling with ice cream, to each amount of product loaded in the container, that is to each weight of product loaded, corresponds an equilibrium position of the lever assembly because of the slope of the rail and the rise of the second arm of the lever and as a result of the counter-weight carrying part along it, because of the fall of the first lever under the effect of the force exerted on its end. Thus, during the fall of the first and hence of the rise of the second arm, the whole system is substantially in equilibrium. When filling of the container is determinated, that is when it has been loaded with a pre-determined weight P of product, a new state of equilibrium is reached in which the point which was initially at B is at B', whereas the point initially at O has moved to C, which is situated on a vertical axis located at a distance $l_2$ of the axis of rotation of the lever, the moments of the forces acting on the first and second arms being then respectively $(T+P) \times L$ and $P_1 \times l_2$ and are also equal to each other, so that: $(T+P) \times L = P_1 \times l_2$, equation in which T, L and $P_1$ are constants dependent on the machine itself whereas P, which represents the weight of product to be filled, in the present case ice cream, may be variable, but is determined accurately for each type of container to be filled and $l_2$, which represents the distance between the axis of rotation of the lever and the vertical of point C may be changed by acting on the slope of the straight rail 20; by way of example, axis X'1—X'1 has been shown which may be that of the rail inclined in a manner to correspond to another value of the quantity of the total product loaded into the container. Hence, the values P and $l_2$ are connected by a linear relation. In other words to every value of the weight P corresponds a value $l_2$ for given values of T, L and $P_1$ for any given machine. It is therefore necessary, for the system to remain in equilibrium at different values of the weight P, to incline the longitudinal axis X1—X1 of the rail 20 at an angle corresponding to this weight P. However, it is clear that as during filling of the container the locus of the counter-weight-carrying part is straight, equality between the moments of the forces applied to each of the arms of the lever is not maintained strictly, equality only being reached at the end of the operation when the container is filled with an amount of product weighing P and the ends B and C of the arms of the levers described above are in the positions B' and C. In intermediate positions the moment, about the axis of rotation, of the forces applied to the second arm of the lever, that is on the side of the counter-weight, is in fact slightly greater than that of the forces applied to the first that is on the side of the container. This difference allows the whole system to resist the exit pressure of the product exerted on the container. The graph of the difference given by way of non-limiting example in FIG. 5 shows different values of the moments of the forces acting respectively on the arm 10a (m1) and the arm 10b (m2) as a function (shown on the abcissae) of the progressive sinking of the container as it is being filled.

By way of example, simultaneously possible values are given hereafter for certain elements of the balancing device for which the graph of FIG. 5 and the Table below were drawn up:

| AB = 185 mm | AC = 200 mm |
|---|---|
| T = 8 kg | $P_1$ = 9.064 kg |

The quantities of products filled may vary between 3.390 kg at least and 4.038 kg at most. In the selected example the weight is the minimum weight, that is 3.390 kg, the value of the distance L being then 160 mm and the angle through which the arm AB rotates being 60°, the arm being in its original position inclined at 30° to the horizontal. Moreover, in the initial position of the lever, the end O of the second arm is disposed in such manner that the distance $L_1$ is equal to 141 mm. After filling of the container the second arm arrives, having rotated through an angle $\alpha = 60°$, in the position AC such that the distance $L_2$ from the point C to the vertical of the axis of rotation is equal to 201.3 mm, the length of the second arm then being AC=210.3 mm (in the case where the weight P of the product loaded into the container is the maximum weight, that is to say 4.038 kg, the inclination of the longitudinal axis of the guide of the counter-weight-carrying part is such that the end of the second arm of the lever arrives in position C' at the end of the filling operation so that its distance $L_2$, measured vertically, from the axis of rotation is 212.8 mm, the length AC' being then 220.4 mm). The Table given below gives by way of example, for a strawberry ice cream, the values of the moments of forces acting on the arm of the lever on the side of the container (column 2) and on the arm of the lever on the side of the counterweight (column 3) as a function of the stroke of the container (column 1) as well as the difference between two corresponding values of these moments (column 4) and the value of the corresponding theoretical minimum force caused by the pressure acting on the ice cream (column 5).

| (1) Stroke of container (mm) | (2) Moment of the forces on the side of the container | (3) Moment of the forces on the side of the counterweight (m.kg) | (4) Difference between (3) and (2) (m/kg) | (5) Theoretical minimum force on the ice cream (g) |
|---|---|---|---|---|
| 0 | 1.281 | 1.281 | 0 | 0 |
| 40 | 1.373 | 1.395 | 0.022 | 137 |
| 80 | 1.478 | 1.511 | 0.033 | 205 |
| 120 | 1.589 | 1.628 | 0.039 | 243 |
| 153 | 1.691 | 1.727 | 0.036 | 224 |
| 185 | 1.824 | 1.824 | 0 | 0 |

When the container is filled with the set quantity, that is the predetermined weight of product, and thereafter the level of the filling platform, that is the end of the rod to which it is connected, is lowered through the corresponding predetermined height, the assembly is locked to allow removal of the container from its supporting platform and its conveyance to the removal and transport means. For this purpose, a locking device, advantageously a hydraulic jack 25, the end of the shaft of which, when it is in fully extended position, is inserted into an opening made for this purpose at the end of the rod 13 and provided, for example, by the space between two small annular flanges affixed to the rod carrying the filling platform and spaced at a distance equal to the thickness of the end of the shaft of the jack.

Complete extension of the shaft of the locking jack is controlled in known manner via the switch tripped by the corresponding rod carrying the filling platform.

When the latter is in locked position, that is when the lever of the filling device is in equilibrium in the position where the moments of forces applied to each of its arms are equal, the shaft of the locking jack, in its turn, activates a control switch for stopping discharge of the ice cream into the container and also controlling extension of the hydraulic jack shaft which removes the filled container from the filling platform and moves it to the conveyor transporting full containers to the labelling station. Using switches similar to those previously described and which are activated by the shafts of corresponding jacks when they are in suitable predetermined positions, the various jacks provided for the different movements of the containers take up their corresponding desired positions. In this manner, when the container which has just been filled on a filling platform has been pushed onto the removal conveyor, the shaft of the corresponding jack activates the control switch for withdrawing the shaft that locks the lever of the filling device, the effect of which is to permit the lever, acted upon by the counter-weight, to rotate in the opposite direction and thereby cause the corresponding platform-carrying rod to rise and hence also the platform. At end of the stroke of the platform-carrying rod produced by extension of the shaft of the corresponding jack, extension which is controlled through a switch activated by the platform-carrying rod, a container is pushed onto this platform, whereas once this container is in position, the means for discharging ice cream into this container opens to fill the latter until, when the weight of product discharged is attained, the rest of the operations described above is repeated in the same order.

Needless to say, the same operations take place successively, in the same manner and in the same order, in the second filling station which is identical with the first and comprises the same elements. Moreover, the different means for moving the containers, either for their distribution or for their removal, consisting as indicated above of hydraulic jacks, locking means also in the form of jacks, valves controlling the opening and closing of the filling means for the containers, as well as means for advancing the different conveyors are with respect to their operation and starting, on the one hand co-ordinated and synchronised among themselves within each container filling assembly, whereas the two assemblies themselves are on the other hand co-ordinated in such a manner that when a container in the filling position has received the predetermined amount of product and that, subsequently, the metering device is locked, flow of product into the container is interrupted by closure of the corresponding outlet valve, this closure causing immediate opening of the valve of the other filling means underneath which is placed, on the corresponding platform, the container which had been brought there during filling of the preceding, or of the operations being interrupted should for whatever reason this container has not been conveyed during filling of the other.

The coordination and synchronisation of these different movements, operations and operation cycles is secured in known manner using pneumatic control relays, some with two positions and three ports, others with two positions and five ports, connected to pneumatic mechanisms for performing logical functions such as the functions "AND", "OR" (inclusive) and the "block" function, in a programmed manner whereby the technical results described above may be obtained automatically. All of the connexions and control mechanisms of these different parts are advantageously grouped in a common cabinet, with a control panel.

The filling machine described above, provided with fully pneumatic equipment for controlling the different operations and routines makes possible the filling of containers distributed between two discharge stations whilst at the same time the discharge rate of the ice cream is synchronised automatically; thus, the containers 4 are advanced in parallel, so that there is no interruption in the flow of ice cream of which the density and overrun consequently remain uniform because the closing of a feed valve on a feeding station causes automatic opening of the feed valve of the adjoining filling station, the effect being a substantial increase in output per unit of time. Moreover, this arrangement makes it possible so to dimension the piping as to permit flow of ice cream at a low temperature, and thus of high viscosity.

Moreover, the balancing and metering device with a beam of which the counterweight moves along an inclined rail, permit constant compensation for the weight increase of the container being filled, which acts via the rod connected to the container-carrying platform on the first arm of the beam.

Moreover since the rail along which moves the balancing counter-weight has a slope which may be adjusted by a manual and visible control the counter-weight may be adapted to the different densities of products being filled.

It is to be understood that the present invention has only been described and shown by way of preferred example and that its constituent parts may be replaced by technical equivalents without going outside the scope of the invention as hereafter claimed.

I claim:

1. A device for metering and balancing the total load of a container during filling, characterized in that it comprises a beam rotatable about a fixed horizontal axis constituting a simple lever, on the end of the first arm of which rests the end of a vertical rod guided for axial movement and of which the other end is affixed to the inside surface of the platform supporting the container during filling, and of which the other arm is made up of two mutually pivoted parts the first being directly attached to the first arm and rotatable simultaneously therewith about the axis of the beam and provided, at its free end, with a rail in which may slide a counterweight pivoted for rotation about a horizontal axis parallel to the axis of the beam, a bearing acting as the support of the axis of the counter-weight being provided with means for allowing it to slide in the rail and being connected to an element forming the second part of the second arm of the beam, which part comprises, at its free end opposed to that provided with the bearing, a slide movable along a straight inclined rail acting as a guide, the straight rail being disposed in a vertical plane perpendicular to the axis of rotation of the beam and the counter-weight and being inclined at a pre-determined angle related to the amount of product to be discharged into each container, the lengths of the arms of the beam and the weight of the counter-weight and the slope of the straight rail co-operating with the second arm being selected so that the moments of the forces acting on each of the arms are at all times substantially equal.

2. A metering and balancing device according to claim 1, characterized in that the slope of the straight rail co-operating with the second arm of the beam of the device for metering and balancing the load in containers during filling is adjustable and that for this purpose, its lower extremity is pivoted for rotation about a fixed axis parallel to the axis of rotation of the beam and that its upper end acting as a slide co-operates both with a sliding element movable along a straight horizontal rail with its axis perpendicular to this axis of rotation of the beam of which the position is adjustable, and via a means affixed to the sliding element, rotatable about an axis fixed with respect thereto and remaining parallel to the axis of rotation of the beam, with a straight guide-path provided on said means.

3. An apparatus for filling products in bulk incorporating the device according to claim 1 or claim 2, characterized in that it comprises: means for stepwise advancing containers for the product close to a filling means, means for feeding the containers to a discharge device for the product being filled, means for conveying each container, filled with a pre-determined amount of product, to a means for removing it from the machine, the filling means being arranged opposite a platform for receiving and carrying the container, which platform co-operates with the metering and balancing device for products being filled at all times during filling of the total load of the container, the metering and balancing device co-operating with a locking means whereby it is immobilized in the position corresponding to the fill of a container filled with the pre-determined amount of product, the different elements co-operating with each other in programmed manner by means of devices for carrying out various logical functions co-ordinating the succession of the different operations.

4. Bulk filling machine incorporation the devices according to claim 1 or 2, characterized in that it comprises: means for stepwise advancing containers for the product close to a filling station, means for feeding the containers alternatively to beneath a first discharge head for the product being filled and to beneath a second discharge head for the product being filled, means for conveying each container filled with a pre-determined amount of product to a means for its removal from the machine, each of the two filling heads being arranged opposite a platform receiving and carrying the container, the platform co-operating at all times during filling of the total load of the container with a device for metering and balancing the weight of the product being filled, the metering and balancing device co-operating with a locking means whereby it is immobilized in the position corresponding to the fill of the corresponding container containing the pre-determined amount of product being filled, the different means utilized co-operating among them selves in programmed manner by means of devices for carrying out different logical functions co-ordinating the operation and functioning so that one container in two is always being filled.

* * * * *